G. Blake.
Rein Holder.
N° 103,008.  Patented May 17, 1870.

Witnesses.
J. M. Cushman
L. T. Talbot

Inventor.
Grinfill Blake

United States Patent Office.

GRINFILL BLAKE, OF TAUNTON, MASSACHUSETTS.

Letters Patent No. 103,008, dated May 17, 1870.

IMPROVED REIN-HOOK.

The Schedule referred to in these Letters Patent and making part of the same

*To all whom it may concern:*

Be it known that I, GRINFILL BLAKE, of Taunton, in the county of Bristol and State of Massachusetts, have invented certain new and useful Improvements in Rein-Hooks; and that the following is a full, clear, and exact description of the same, reference being had to the accompanying drawings making a part of this specification, in which—

Figure 1:
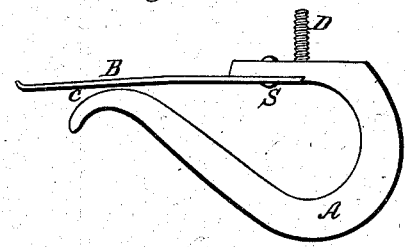
Figure 2:
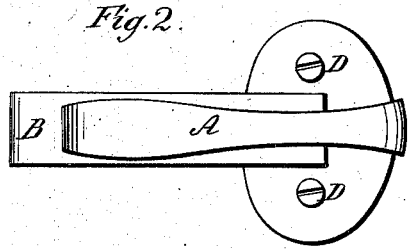

Figure 1 is a side view, and
Figure 2, a top or bird's-eye view of the hook.
A is the hook;
B, the spring;
C, the opening between the hook and spring;
D D, screws to secure the hook to the carriage; and
S, a rivet securing the spring B to the hook A.

The nature of my invention consists in so securing the hook that the reins, when hung upon it, cannot be thrown out.

It is a well-known fact that, when the common rein-hook is used, the horse, by the switching motion of his tail, is liable to strike the reins, and throw them from the hook, and, dropping down, they are often found in the mud under the horse's feet.

The hook is made of metal, and is secured, by means of the screws D D, in its usual place on the under side of a carriage-top.

To the plate or foot of the hook, at S, the spring B is secured, this spring being of sufficient width to cover well the point of the hook, and extending a short distance beyond it.

The hook is of the general form shown in fig. 1, and at its point C turns outward and downward, so as to leave a sufficient opening between the spring and the point of the hook, for the quick and easy introduction of the reins.

This makes a safe and secure hold-fast for the driving-reins, from which they cannot be dislodged by any accidental motion whatever.

What I claim as my invention, and desire to secure by Letters Patent, is—

The above-described rein-hook, constructed as shown and described, and provided with a spring, as a new article of manufacture.

GRINFILL BLAKE.

Witnesses:
J. M. CUSHMAN,
L. T. TALBOT.